United States Patent
Steeves et al.

(10) Patent No.: US 11,469,907 B2
(45) Date of Patent: Oct. 11, 2022

(54) SYSTEMS AND METHODS FOR COLLECTION OF ELECTRONICALLY SIGNED DATA

(71) Applicant: Open Text SA ULC, Halifax (CA)

(72) Inventors: Ryan David Steeves, Burlington (CA); Melissa Colleen Kleiber, New Hamburg (CA)

(73) Assignee: OPEN TEXT SA ULC, Halifax (CA)

( * ) Notice: Subject to any disclaimer, the term of this patent is extended or adjusted under 35 U.S.C. 154(b) by 252 days.

(21) Appl. No.: 16/810,167

(22) Filed: Mar. 5, 2020

(65) Prior Publication Data
US 2021/0281419 A1 Sep. 9, 2021

(51) Int. Cl.
H04L 9/40 (2022.01)
H04L 9/32 (2006.01)
G06F 16/23 (2019.01)

(52) U.S. Cl.
CPC ........ H04L 9/3247 (2013.01); G06F 16/2379 (2019.01)

(58) Field of Classification Search
CPC ............................ H04L 9/3247; G06F 16/2379
See application file for complete search history.

(56) References Cited

U.S. PATENT DOCUMENTS

| | | | |
|---|---|---|---|
| 6,925,182 B1 * | 8/2005 | Epstein | H04L 9/0866 380/277 |
| 9,129,095 B1 * | 9/2015 | Lam | H04L 63/061 |
| 2002/0178187 A1 * | 11/2002 | Rasmussen | H04L 63/12 715/234 |
| 2006/0212707 A1 * | 9/2006 | Cahill | H04L 9/3263 713/176 |
| 2009/0024912 A1 * | 1/2009 | McCabe | G06Q 10/10 715/224 |
| 2013/0218330 A1 * | 8/2013 | Chudy | G16H 20/10 700/244 |
| 2014/0074515 A1 * | 3/2014 | Sylvester | G06Q 30/0635 705/26.81 |
| 2015/0381614 A1 * | 12/2015 | Hildreth | H04L 67/06 726/7 |
| 2017/0199858 A1 * | 7/2017 | Yeh | G06F 21/6218 |
| 2017/0344931 A1 * | 11/2017 | Shenk | G06Q 10/063116 |
| 2018/0113845 A1 * | 4/2018 | Aggarwal | H04L 65/403 |
| 2018/0330423 A1 * | 11/2018 | Clayton | G06Q 30/0643 |
| 2021/0126882 A1 * | 4/2021 | Everton | H04L 51/16 |
| 2021/0233087 A1 * | 7/2021 | Edwards | G06Q 20/40145 |
| 2021/0240766 A1 * | 8/2021 | Nguyen | G06F 16/838 |

* cited by examiner

*Primary Examiner* — Ghodrat Jamshidi
(74) *Attorney, Agent, or Firm* — Sprinkle IP Law Group

(57) ABSTRACT

Systems and methods for enabling collection of signed data in a collaborative content sharing platform. One embodiment is a method including producing a form having one or more data entry components and at least one signature block component, selecting assignee users of the content sharing platform, providing the form to the selected assignee users, enabling these users to enter data and sign the form, and storing the assignee users' data in a data structure which is separate from the form, where the data structure includes a record for each assignee user, the record containing data entered by the user and electronic signature data for the user. The data structure is protected in the same manner as other data in the collaborative content sharing platform and may be accessible by some users, but not others, in accordance with their respective roles and authorizations.

20 Claims, 16 Drawing Sheets

| | A | B | C | D | E | F |
|---|---|---|---|---|---|---|
| | What are your total travel expenses? | What was the purpose of your visit/travel? | What percentage of your trip was spent at the conference? | What percentage of your trip was spent travelling? | Please review our internal Travel Policy document before submission | *Please sign below to acknowledge your acceptance of our Travel Policy |
| 2 | CAD $ 1,877.23 | I flew out of Toronto on September 15 to San Diego, California to attend a 3-day | 70 | 30 | Clicked | https://acme.com/api/v1/documents/13747420618775604394/ versions/13747420632868466939/contents; |
| 3 | CAD $ 3,222.12 | Expenses include my airfare and accommodations for three days at Adobe MAX | 80 | 20 | Not Clicked | https://acme.com/api/v1/documents/13747420618775604394/ versions/13747420632868466939/contents; |
| 4 | USD $ 1,129.10 | NYC for overnight training, I had to fly in from Toronto stay overnight at the | 90 | 10 | Clicked | https://acme.com/api/v1/documents/13747420618775604394/ versions/13747420632868466939/contents; |
| 5 | CAD $ 829.77 | Overnight accommodations for the two nights in downtown Toronto for a customer | 65 | 35 | Clicked | https://acme.com/api/v1/documents/13747420618775604394/ versions/13747420632868466939/contents; |
| 6 | AUS $ 468.25 | I took the VIA rail into the city to attend the Design Thinkers conference on | 80 | 20 | Clicked | https://acme.com/api/v1/documents/13747420618775604394/ versions/13747420632868466939/contents; |

FIG. 5L

SYSTEMS AND METHODS FOR COLLECTION OF ELECTRONICALLY SIGNED DATA

TECHNICAL FIELD

This disclosure relates generally to enterprise information management, and more particularly to systems, methods and products that are implemented in a collaborative file sharing platform that enables the collection, storage and sharing of electronically signed data apart from a specific document.

BACKGROUND OF THE RELATED ART

Enterprise information management is a particular technical field in Information Technology. Enterprise information management combines many enterprise class systems such as enterprise content management, business process management, customer experience management, and business intelligence. An enterprise information management system may utilize a content server to, among other things, store, and manage an organization or enterprise's digital assets such as content and documents (which are collectively referred to herein as "managed objects" or "content objects"). The content server conventionally operates behind the enterprise's firewall, and is configured so that only authorized users may have secure access to the managed objects in order to protect the managed objects.

It may be desirable for users associated with the enterprise to allow collaboration and/or file sharing between users. ("Files" is used herein to refer to managed objects that may include documents or other types of content.) In the case of external users (those who are not associated with the enterprise or who do not physically reside in a building of the enterprise), they are generally not authorized to access the enterprise's enterprise information management system. Consequently, they cannot view and/or edit any of the restricted files managed by the enterprise's content server. It may be possible to provide content sharing capabilities in a cloud-based system. For example, in one such system, managed objects may be uploaded by authorized enterprise users to a cloud-based file sharing system that is accessible by external users as well as enterprise users.

Collaborations between users of the file sharing system may, in various instances, require approval of one or more of the users. Typically, this will involve approval of a particular managed object, such as a document. The document may, for example, be an agreement, a change to a contract, or some other document that reflects some aspect of the collaboration. The documents may be subject to review and approval by one or more of the users. In this case, the document will be generated and then provided to the specific users whose approval is required. If a user approves of the document, the user may then electronically sign the document. In some instances, the user may modify the document and then sign the finalized document. When the document has been electronically signed, the document is stored with information indicating the corresponding electronic signature.

While it is very beneficial to be able to electronically sign such documents, there are some disadvantages to this conventional approach. One of the drawbacks is that the approach is document-centric. The document must be prepared and finalized before it is signed, which may take a great deal of time and resources. Once the document is signed, the document and any data that is embedded in the document is typically locked. If multiple users are required to sign the document, it is normally necessary to send the finalized document (or a copy of the finalized document) to each of the users for their respective signatures. This approach may be inefficient and relatively inflexible, and may therefore be unsuitable for situations in which a user wishes to quickly and efficiently collect signature-verified data, rather than approval of a completed document.

SUMMARY OF THE DISCLOSURE

Embodiments of the present invention may provide solutions to one or more of the problems described above. For example, one embodiment enables the generation and sharing of electronically signed data in a collaborative cloud-based file sharing system. In this system, an authorized user can create a form that allows users to collaborate on the collection of data and to individually sign the respective data that is provided by each user. The collected data may be aggregated in a data structure such as a database table which includes data provided by multiple users, where the data is separate from the form. Data in the table which is provided by a particular user is signed by that user, while data in the table which is provided by another user is signed by the other user. The collection of the data in this manner eliminates the conventional document-centric approach. Thus, it is not necessary to generate a document which contains the data to which the user's electronic signature attests, and it is not necessary to provide a separate copy of the document (or a distinct document) to each user for that user's signature. In fact, the form may be changed during data collection, and data collection may be ended at any time (e.g., before all requested users have provided data and/or signatures). By eliminating the need to generate a completed document which is signed by the user, embodiments disclosed herein allow verified data to be collected more quickly and more easily than conventional approaches. Additionally, aggregating the electronically signed data of each user in a combined data structure may facilitate the use of the aggregated data, as compared to scenarios in which the data associated with each user is embedded in a separate electronically signed document.

One embodiment comprises a method for enabling collection of signed data in a collaborative content sharing platform. This method includes producing a form that has one or more data entry components and at least one signature block component. One or more assignee users of the collaborative content sharing platform are selected, and the form is provided to the selected assignee users, who are thereby enabled to access the form. The method further includes receiving information from at least one of the selected assignee users, the information including first input corresponding to at least one of the one or more data entry components, and second input associated with the first input, where the second input is indicative of an electronic signature of the assignee user. For each of the responding assignee users, the first input is stored with the corresponding second input indicative of the assignee user's electronic signature in a data structure which is separate from the form.

In some embodiments, the first input of the assignee user and a reference to the electronic signature of the assignee user are stored in the same record of a database table. The database table does not contain the form, but may contain an identifier associated with the form. The database table may include multiple records, where each record corresponds to a different one of the responding assignee users (e.g., a first record may be associated with a first assignee user and a second record may be associated with a second assignee user). The selected assignee users may include a tenant user of the collaborative content sharing platform and/or an external user who is not a tenant of the collaborative content sharing platform. In the case of the tenant user, the method may include identifying electronic signature data stored in the collaborative content sharing platform, verifying the second input indicative of the electronic signature using the electronic signature data stored in the collaborative content sharing platform, and storing a reference to the electronic signature data stored in the collaborative content sharing platform. In the case of the external user, the method may include verifying the second input indicative of the electronic signature using electronic signature data external to the collaborative content sharing platform, and storing a reference to the electronic signature data In a record stored in the collaborative content sharing platform.

An alternative embodiment comprises a system for enabling collection of signed data, where the system includes a collaborative content sharing platform having one or more processors, one or more data storage devices communicatively coupled to the content sharing platform, and one or more user devices communicatively coupled to the content sharing platform. In this embodiment, the content sharing platform is configured to enable a first user on a first one of the one or more user devices to produce a form having one or more data entry components and at least one signature block component. The content sharing platform is further configured to enable the first user to select one or more assignee users from whom input will be requested through the form. The wherein the content sharing platform is further configured to provide the form to the selected assignee users and to enable the one or more selected assignee users to access the form. The content sharing platform receives input from one or more of these assignee users, the input of each assignee user including first input corresponding to at least one of the data entry components and second input indicative of an electronic signature of the corresponding assignee user. The content sharing platform stores the information for each of the responding assignee users in a data structure in the one or more data storage devices which is separate from the form.

The content sharing platform may be configured to store the first input for each assignee user with a corresponding reference to the electronic signature of that assignee user in the same record of a database table. The record may contain an identifier associated with the form, but does not contain the form. The content sharing platform may contain a forms app which is configured to enable the first user to build the form by selecting one or more form components, at least one of which is a signature component, adding the selected form components to the form, and configuring one or more attributes of the added form components. The content sharing platform may be configured, for assignee users who are tenant users of the collaborative content sharing platform, identify electronic signature data stored in a data storage device internal to the content sharing platform, verify the second input indicative of the electronic signature using the electronic signature data stored in the collaborative content sharing platform, and store a reference to the electronic signature data stored in the collaborative content sharing platform. The content sharing platform may be configured, for assignee users who are external user who are not tenants of the content sharing platform, verify the second input indicative of the electronic signature using electronic signature data external to the collaborative content sharing platform, and store a reference to the electronic signature data In a record stored in the collaborative content sharing platform.

Another alternative embodiment comprises a computer program product including a non-transitory computer-readable medium storing instructions executable by one or more processors to perform a method that includes producing a form, selecting assignee users, providing the form to the selected assignee users, receiving input data and signatures from the assignee users, and storing the input data and corresponding electronic signature information in a data structure separate from the form. In some embodiments, first input data of an assignee user and a reference to the user's electronic signature are stored in the same record of a database table which may contain an identifier associated with the form, but does not contain the form itself. The database table may include multiple records, each corresponding to a different assignee user. The selected assignee users may include a tenant user of the collaborative content sharing platform and/or an external user who is not a tenant of the collaborative content sharing platform. For a tenant user, electronic signature data stored in the collaborative content sharing platform may be identified and verified, and a corresponding reference may be stored in the user's data record. For an external user, input indicative of the user's electronic signature may be verified using electronic signature data external to the collaborative content sharing platform, and a reference may be stored in the user's data record.

One alternative embodiment comprises a system having a processor and a non-transitory computer-readable storage medium that stores computer instructions executable by the processor to perform a method substantially as described herein. Another embodiment comprises a computer program product having a non-transitory computer-readable storage medium that stores computer instructions executable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 5A-5L depict screenshots illustrating an example of the creation of a form and the collection and storage of signed data using the form according to one embodiment.

DETAILED DESCRIPTION

Figure 1:
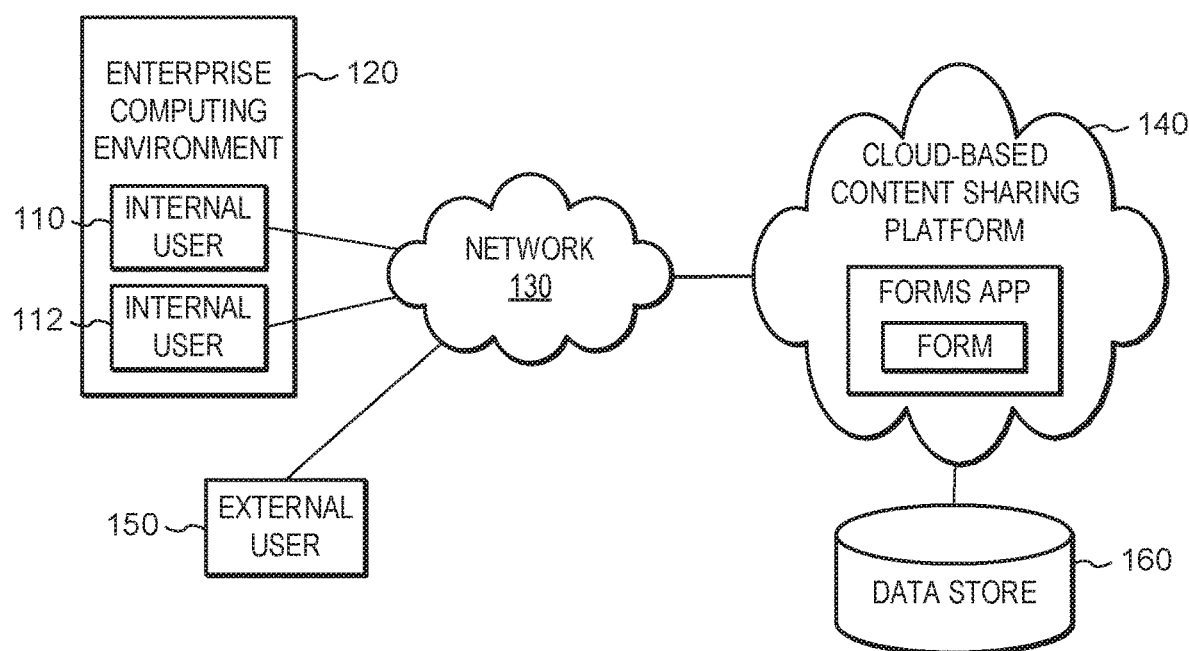
FIG. 1 depicts a diagrammatical representation of a system for collaboration based on an enterprise computing environment according to some embodiments disclosed herein.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

This disclosure describes a collaborative content sharing platform which may operate external to an enterprise computing environment, allowing users can safely and securely share and collaborate to generate objects such as combined data structures that store data collected by different users, portions of which are separately signed by the respective users that provided the data. The platform may, for example, enable an authorized user to create a form that can be provided to selected users, who can then enter data in the form, make selections presented in the form, or otherwise provide information through the form. The users can then provide an electronic signature via the form to attest to the information that they provided through the form. The information provided by each user is attached to the electronic signature of that user and is stored in a repository on the platform. While the information provided by each user may reference the form, the data is not stored in the form, but is instead stored apart from the form. The information provided by each user can therefore be easily used without having to first extract or separate the information from the form. The information provided by multiple users may also be aggregated in a single data structure, which allows the combined data to be easily viewed or used by an authorized user.

As noted above, electronic signatures conventionally are used in conjunction with specific documents—a specific document is prepared and reviewed, and then the finalized document is electronically signed. The electronic signature is associated with the completed document. If several users electronically sign a document in a collaborative environment, each of the signatures is associated with the specific document on which they collaborated. Although information can be gleaned from the document, the information is normally integral with the document, and some effort must be taken to extract the information from the document in order to make use of the information. Embodiments of the present invention provide solutions to these problems. These embodiments still allow users to collaborate, but they collaborate using a form which allows each of the users to provide different information, and when they signed the form, each user's signature is associated with the specific information provided by that user, rather than the form document itself. The individually signed information may be stored in a structure such as a database table which may be directly accessed to make use of the data, rather than having to extract the information from multiple signed documents. The database table has the same types of data protections which are provided for other data on the content sharing platform.

In some embodiments, the content sharing platform comprises a cloud-based multitenant system. Since there is a need to secure access to the managed objects and to prevent tenants from accessing other tenants' managed objects without authorization, the managed objects may be encrypted. An administrator for each tenant may configure access permissions for the tenant's managed objects in order to enable access by users (typically those associated with the tenant) to the managed objects. In some instances, it may be desirable for the tenant to share its managed objects with external users who are not part of the enterprise, not subscribed to content sharing platform, or not otherwise authenticated. Functionality is provided in the present embodiments to facilitate sharing and collaboration relating to collection of signed data without necessitating that a tenant administrator configure access permissions in each instance. This is accomplished in the present embodiments by building structure around the collaboration using shareable forms and electronic signature capabilities. The system may associate selected users with forms and may enable access by the users to the forms consistent with selection of the users by a user who has the necessary authorization to access the system.

Referring to FIG. 1 is a diagrammatic representation of a system 100 for collaboration based on an enterprise computing environment. In this example, internal users 110, 112 reside on-prem within an enterprise computing environment 120. ("On-premise" or "on-prem" refers to the physical location of the server within a building of the enterprise.) As mentioned above, in some cases, an enterprise user may need to collaborate and/or share files with external users, so enterprise computing environment 120 is connected by a network 130 to a cloud-based content sharing system 140. Content sharing system 140 can be accessed by internal users 110, 112 and external users (e.g. 150) to collaborate. Shared data may be stored on data store 160. Skilled artisans appreciate that a content sharing system (e.g., 140) can be hosted in a cloud computing environment or located on-prem in an enterprise computing environment. Accordingly, FIG. 1 is meant to be exemplary and non-limiting.

As mentioned above, in some cases, an enterprise user may need to collaborate and/or share files with external users. For example, an enterprise user may wish to collect information on a series of transformers that are in the field. The transformers may be inspected by contractors in the field who are not part of the enterprise (i.e., who may be "external" to the enterprise), so they may not have access to the enterprise information management system. Since the enterprise user needs input from these external contractors who will be inspecting the transformers, the enterprise user may generate a form and make this form available to the external users through the cloud-based content sharing system. The content sharing system may provide encryption and other security measures to control access to the form and the data that may be provided through the form. The enterprise may then share those objects according to access controls that are implemented by the content sharing system.

Figure 2:
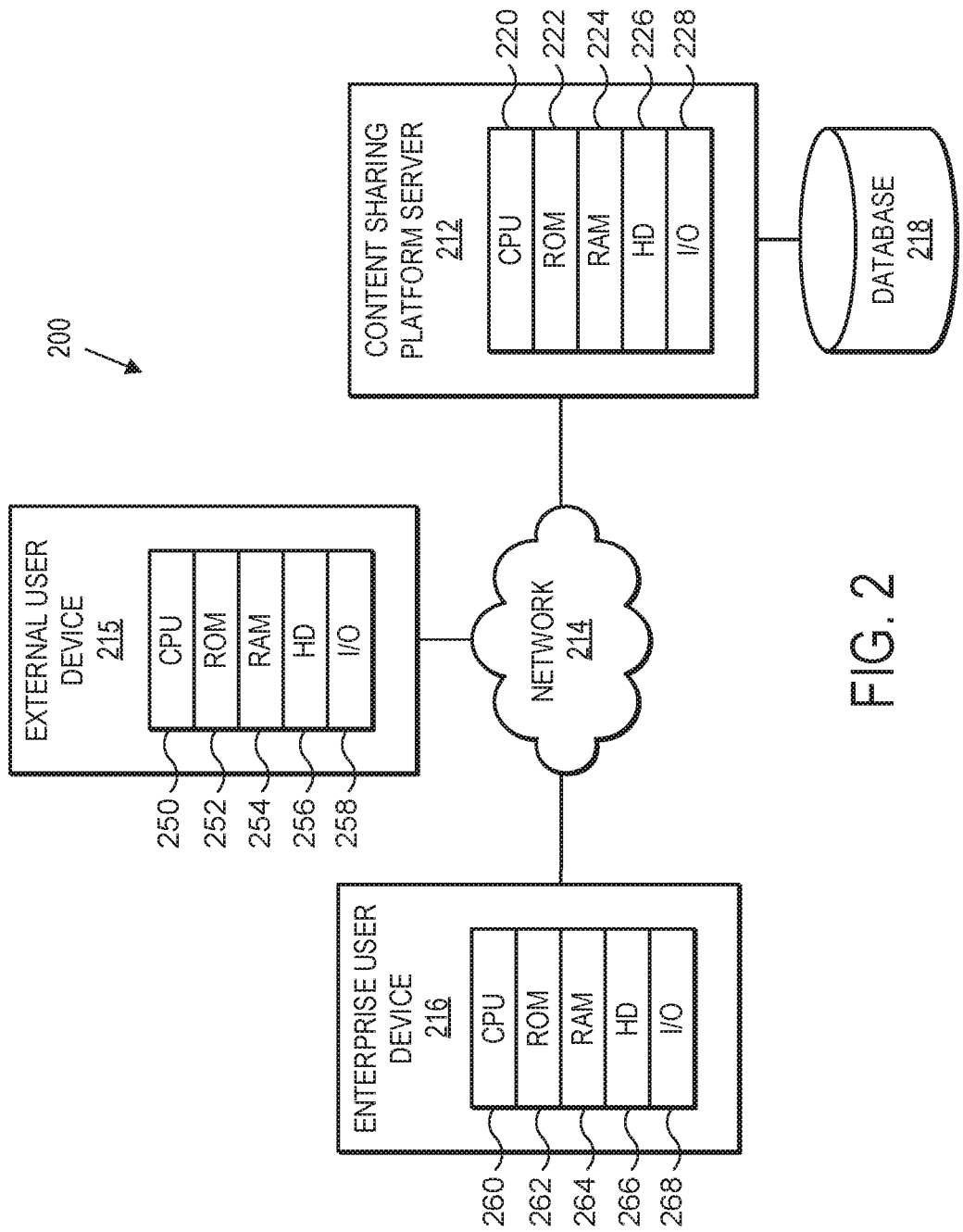
FIG. 2 depicts a diagrammatical representation of an exemplary distributed network computing environment in which some disclosed embodiments can be implemented.

FIG. 2 depicts a diagrammatic representation of a distributed network computing environment in which embodiments disclosed herein can be implemented. In the example illustrated, network computing environment 200 includes network 214 that can be bi-directionally coupled to a server computer 212 that executes the multitenant platform, and a user computer 216. Computer 212 can be bi-directionally coupled to data store 218. Network 214 may represent a combination of wired and wireless networks that network computing environment 200 may utilize for various types of network communications known to those skilled in the art.

For the purpose of illustration, a single system is shown for each of computer 212 and computer 216. However, with each of computer 212 and computer 216, a plurality of computers (not shown) may be interconnected to each other over network 214.

Computers 216 may include data processing systems for communicating with computer 212. Computer 216 may include data processing systems for individuals whose jobs may require them to configure services used by computers 212 in network computing environment 200.

First computer 212 can include central processing unit ("CPU") 220, read-only memory ("ROM") 222, random access memory ("RAM") 224, hard drive ("HD") or storage memory 226, and input/output device(s) ("I/O") 228. I/O 228 can include a keyboard, monitor, printer, electronic pointing device (e.g., mouse, trackball, stylus, etc.), or the like. Computer 212 may include one or more backend systems configured for providing a variety of services to computers 212 over network 214. These services may utilize data stored in data store 218. Many other alternative configurations are possible and known to skilled artisans.

Likewise, computer 216 may include CPU 260, ROM 262, RAM 264, HD 266, and I/O 268. Computer 216 can include a desktop computer, a laptop computer, a personal digital assistant, a cellular phone, or nearly any device capable of communicating over a network. Computer 215 may be similar to computer 212 and can comprise CPU 250, ROM 252, RAM 254, HD 256, and I/O 258.

Each of the computers in FIG. 2 may have more than one CPU, ROM, RAM, HD, I/O, or other hardware components. For the sake of brevity, each computer is illustrated as having one of each of the hardware components, even if more than one is used. Each of computers 212 and 216 is an example of a data processing system. ROM 222 and 262; RAM 224 and 264; HD 226 and 266; and data store 218 can include media that can be read by CPU 220 or 260. Therefore, these types of memories include non-transitory computer-readable storage media. These memories may be internal or external to computers 212 or 216.

Portions of the methods described herein may be implemented in suitable software code that may reside within ROM 222 or 262; RAM 224 or 264; or HD 226 or 266. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Figure 3:
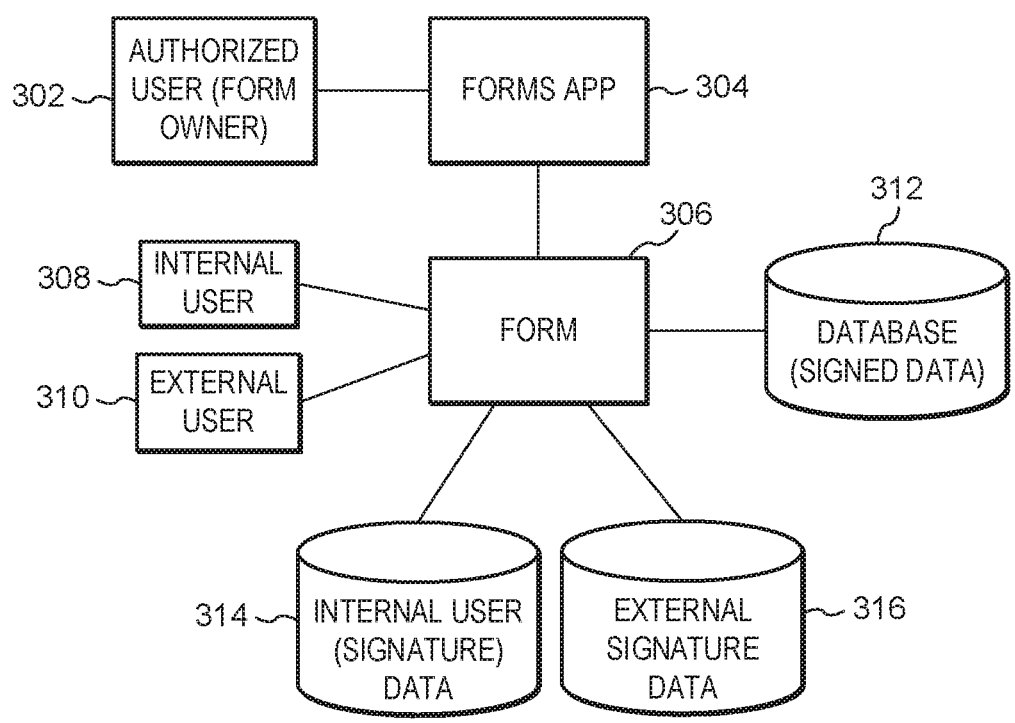
FIG. 3 is a diagrammatical representation of signed data collection using the content sharing platform in accordance with some embodiments.

Referring to FIG. 3, a diagrammatic representation of signed data collection using the content sharing platform in accordance with some embodiments is shown. In this embodiment, an authorized user 302 accesses a form building application 304 on the content sharing platform. Authorized user 302 may, for example, be a tenant user associated with a tenant of the cloud-based multitenant system, where the tenant is a subscriber of the content sharing platform and the form building application. Authorized user 302 may log into the system and build a form 306 using the form building application. Form building application 304 may provide various different types of form elements that may be added to the form, such as text areas, formatted text or numeric fields, drop-down lists, dates, checkboxes, radio buttons, sliders, etc. each of the elements that are added to the form may be configured as needed by authorized user 302. An electronic signature element is also added to form 306.

After authorized user 302 has built form 306, the user may identify other users that will be invited to provide information via form 306. These users may include both internal users 308 and external users 310. Users who are registered with the content sharing system, members of tenants subscribed to the system, or who otherwise have access to the system are considered internal users, for the purposes of this disclosure. Users who do not have such access to the system are considered external users for the purposes of this disclosure.

Users 308 and 310 have been invited to provide information through 306 form are then allowed to access the form. Internal users may login to the system using the same procedures by which they normally access the system. External users may access the form using links that are contained in their respective invitations to provide information via the form. Each user may provide all or a portion of the information that is requested on the form (i.e., information corresponding to the data entry elements provided in the form). After a user has provided information on the form, the user may electronically sign the form, thereby certifying that the corresponding data was provided by the attesting user.

The data which is provided by each user through the form is saved in a data structure which is separate from the form itself. For example, the data structure may be a database table 312 that includes fields for each of the elements in the form. A particular user's information may be stored as a single record in this database table. This record includes, for each of the fields, a corresponding value that was provided by the user. As noted above, the user need not provide entries for each one of the form elements.

One of the fields in the database table is an electronic signature field that stores an indicator of the user's signature. In one embodiment, electronic signature data for the internal users is stored in a database 314 on the content sharing platform itself, so the indicator of the signature for these users may simply be a reference to this stored electronic signature data. Since the system does not store signature information for external users, the indicator of the electronic signature for external users may be retrieved from a separate, external database 316, and may include a different type of information which may allow reference to, or verification of, the signature.

Figure 4:
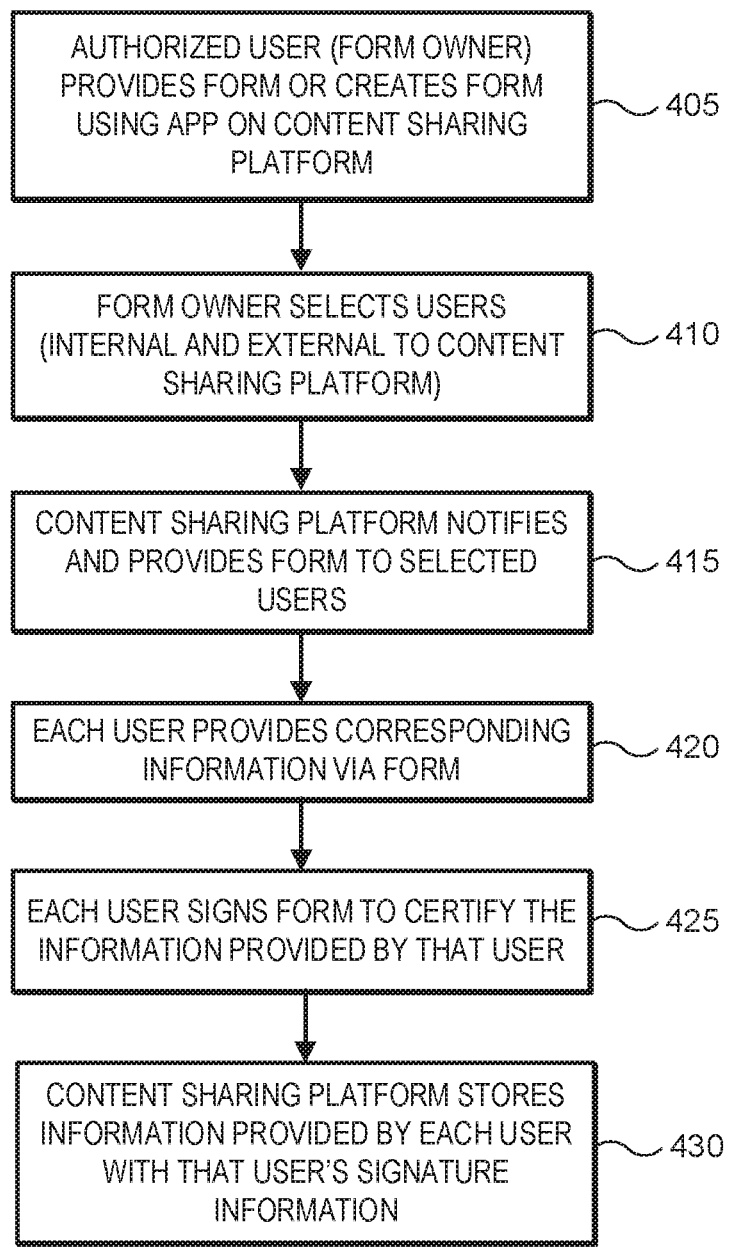
FIG. 4 depicts a flow diagram summarizing the collection of signed data on a content sharing platform in accordance with some embodiments.

Referring to FIG. 4, a flow diagram summarizing the collection of signed data on a content sharing platform in accordance with some embodiments is shown. In this embodiment an authorized user initially provides a form through which a user can enter data and sign the provided information (405). The form may be one that was previously created and stored on the content sharing platform, or it may be one that is newly created by the authorized user for the purpose of collecting the data. In the examples provided below, the creation of a new form will be described in more detail. Whether the form is one that was previously generated and stored, or one that is newly created, the authorized user may be referred to as the "form owner" for the purposes of describing this method.

When the form that will be used to collect the data has been selected or created, the authorized user selects one or more users from the data will be collected (410). The users that are selected to provide the data may be internal users who are already registered with the content sharing platform, or they may be external users who are not known to the platform. Internal users may include, for example, members of entities that are tenants of the multitenant environment and subscribers to the content sharing platform. These internal users are capable of logging into the content sharing platform and using the platform, independent of their selection to provide data via the form. External users may not have access to the content sharing platform apart from their selection to provide data through the form, but are authorized via their selection by the authorized user to provide information through the form. Accordingly, these external users' access to the content sharing platform may be limited so that they are only allowed access which is necessary to provide the information requested on the form by the authorized user.

After the form owner selects one or more users from home data will be collected using the form, the content sharing platform provides notifications to each of the selected users and enables these users to access the form (415). The notification to an internal user may, for example, comprise a notification dialog box which indicates that the user has been requested to provide information through the form. This notification may identify the form owner and provide a link to the form to facilitate the users access to the form. In the case of external users, the notification may, for example, comprise an email with a link to the form and a request for the user to provide information via the form.

When the selected users receive the notification to provide input to the form, each user can access the form (e.g., via a link to the form included in the notification) and can input information to the form (420). As noted above, internal users' access to the content sharing platform may have already been enabled through a subscription of a tenant with which the user is associated, while external users' access may be enabled in an ad hoc manner through the action of the form owner requesting the users' input via the form. It should be noted that, although internal users may have already had access to the content sharing platform, access to the specific form for which input is requested will be limited to those users specifically selected by the form owner.

After each user has input his or her information to the form, the user will electronically sign the form via a signature block or other signature element provided on the form (425). The content sharing platform will then store the information that was provided by the user in a data structure which includes the provided data, as well as the user's electronic signature (430). For example, the system may store the data in a database table, where each record in the table contains the data provided by a specific user, along with the user's electronic signature information. While the table may include a reference to the form, the data itself will be stored in the table apart from the form. In some embodiments, when a user signs the form, the system will "lock" the information so that the signed data cannot thereafter be altered. In alternative embodiments, the content sharing platform may be configured to enable the user to edit signed data. In some embodiments, the collection of data via the form is open ended, so that collection of data can be ended at any time—it is not necessary to wait for all of the selected users to provide input before data collection through the form is ended. Additionally, in some embodiments, the user (form owner) may be able to modify the form during data collection (e.g., adding, deleting or modifying form components, or modifying the assignee users who are requested to enter data through the form).

In some embodiments, the form may be constructed using a forms app of a cloud-based multitenant content sharing platform. An authorized user of the system may access the app by directing a browser to a login page of the content sharing platform. A server of the content sharing platform may receive the user's credentials as provided through the login page and verify the credentials. If the user's credentials are verified, the server may identify a tenant object corresponding to the tenant that is associated with the user (i.e., the enterprise with which the user is associated). The server may then identify and implement the settings associated with the retrieved tenant object. The settings may, depending upon the tenant's license level, allow the tenant and the authorized user to access specific functionalities provided by the content sharing platform, such as workflows, workflow templates, forms apps, etc. The form-based collection of signed data described herein may be implemented in conjunction with these other functionalities (e.g., as a part of a structured workflow generated using a workflow template), but this is not necessary in all cases, and the use of forms to collect signed data may not be constrained by a particular workflow. If the form-based collection of signed data is implemented with other functionality of the content sharing platform, the authorized user's selection of an external user to provide signed data through a form as described herein implies authorization of the external user to access this additional functionality, to the extent that the authorized user has access to the functionality.

In one embodiment, when an external user responds to a request for form-based collection of signed data, the user may direct a browser to a login page at the URL of the content sharing platform. The user may log in, providing a user credential which is used by the content sharing platform to determine whether there is a pending request to provide data via a form. If so, the platform may generate a user homepage that includes a link to the form associated with the request, and the user may access the form through the link. If there are no pending requests, the platform may generate a user homepage for the external user that does not enable unauthorized functionality, but provides access to some limited set of functions.

In some embodiments, providing signed data through the form may involve indirect access to a native content object (e.g., adding data to a database table), so the platform may verify the external user's access permission to both the form and the native content object. After the external user's permission to access the form and/or the native object have been verified, the user can access the form to enter data in the defined form fields and sign the form. The data entered by the user in the form (including the user's electronic signature information) is then added to the native content object. In some embodiments, even though the user is allowed to enter data into the native content object through the form, the user may not be allowed to view or edit data in the native content object.

Figure 5A:
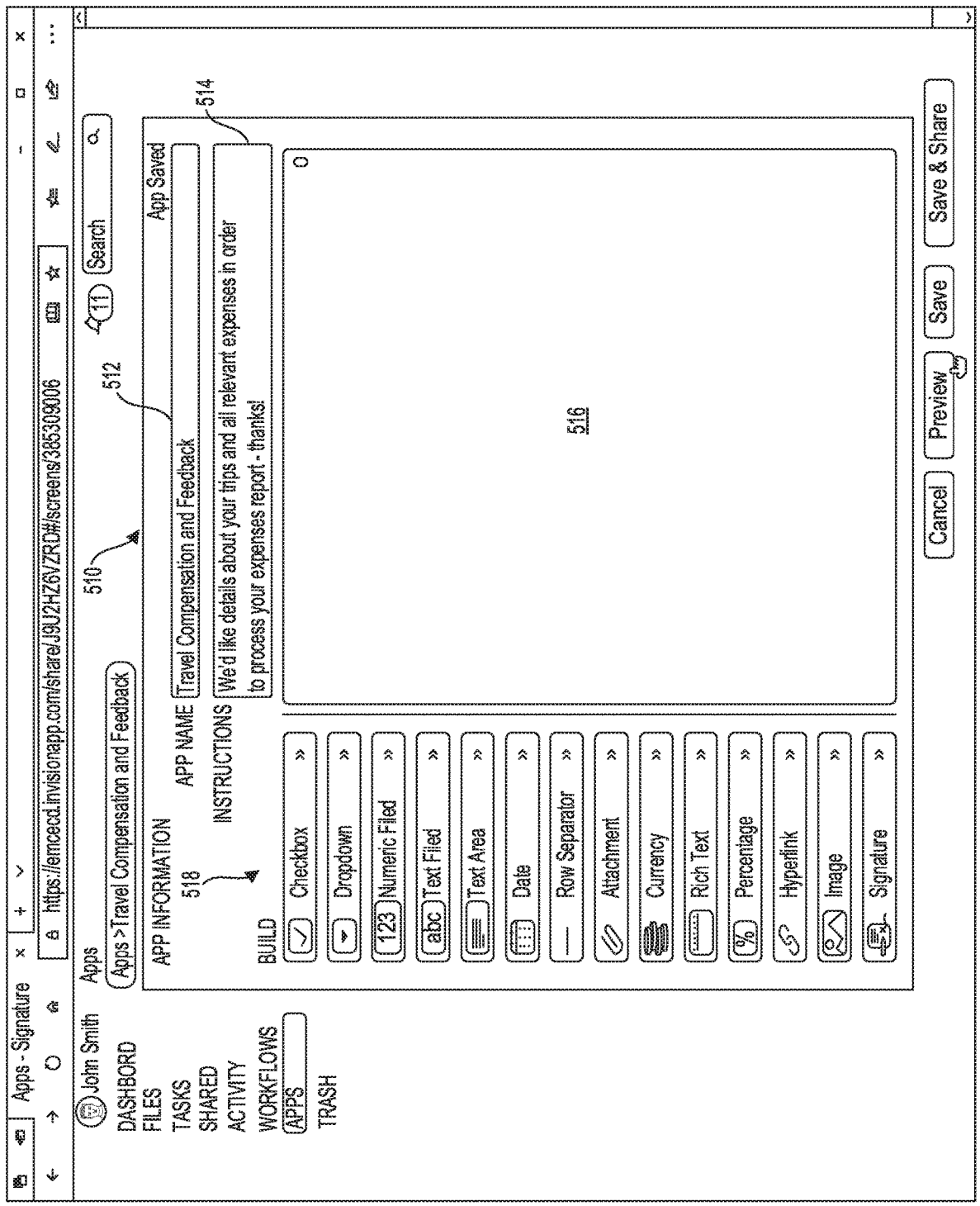

Referring to FIGS. 5A-5L, a set of diagrams are provided to illustrate an example of a user generating a form and collecting signed data using the form. As noted above, the authorized user must first provide a form to collect the desired data. In this example, the authorized user creates a form using a corresponding form app on the content sharing platform. The web-based interface of the app is illustrated in FIG. 5A. As depicted in this figure, the user has created a new blank form 510. The user may provide a name 512 for the form, as well as instructions 514 which will be provided to users who are requested to fill out the form. Initially, the body 516 of the form is empty. A menu 518 of form components is provided at the left side of the form app. Menu 518 includes a set of buttons, each of which corresponds to a different type of form component. In this example, the form components include checkboxes, drop-down's, numeric fields, text fields, text areas, dates, row separators, attachments, currency, rich text, percentages, links, images, and signature. Each of these form components can be selected to be added to the body 516 of the form. A form component may, for example, be selected by dragging and dropping the component into the body of the form. The component may then be edited as needed for the form.

Figure 5B:
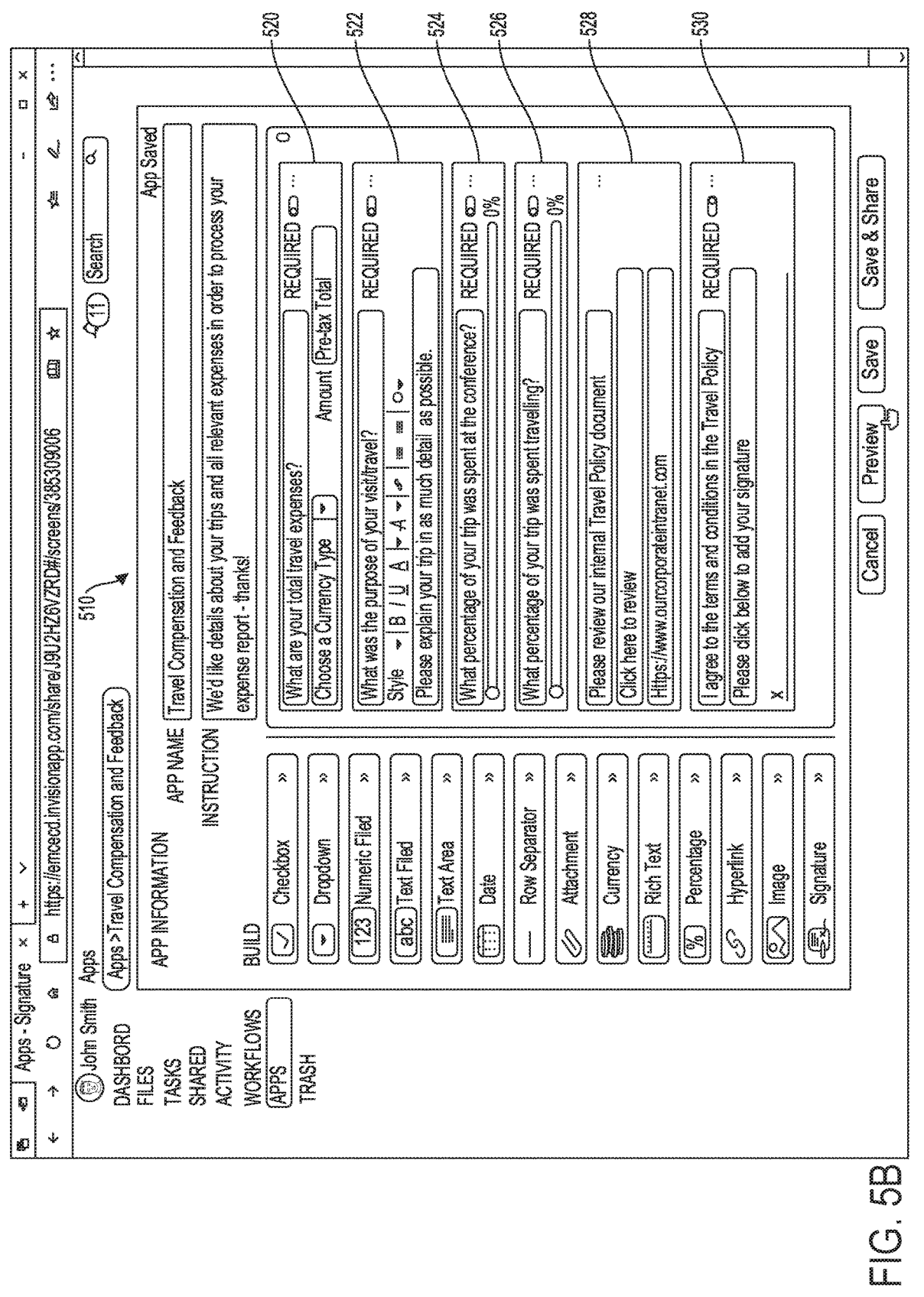
Figure 5C:
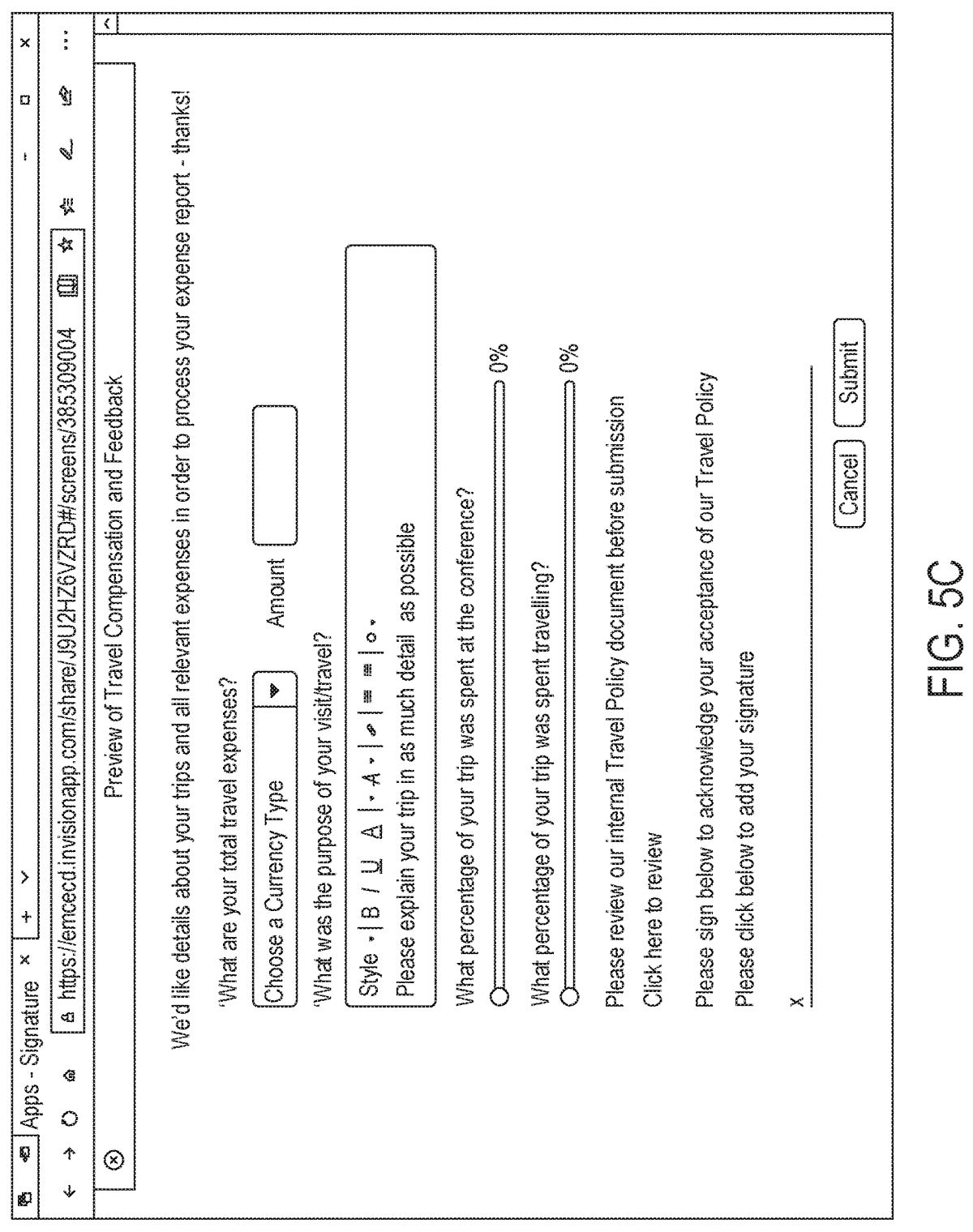

Referring to FIG. 5B, form 510 is shown after a number of form components have been added to the body of the form. These components include a currency component 520, a rich text component 522, two percentage components 524 and 526, a hyperlink component 528, and a signature component 530. Each of the components includes one or more configurable attributes, such as a prompt area in which the user can identify the requested information. For example, in currency component 520, the user has entered the text "what are your total travel expenses?". This text will be displayed on the form so that the user is filling out the form is aware of the specific information that is being requested. Each of the form components may include corresponding controls and input fields that are appropriate for that particular component. Each of the form components also includes a button that the user can select to indicate whether or not a response is required when the form is filled out by another user. In this example, data is not required for components 520, 522, 524, 526, or 528, but a signature is required in signature component 530. When the authorized user has finished building the form, the user may elect to preview the form. The preview of the form built by the authorized user is shown in FIG. 5C.

Figure 5D:
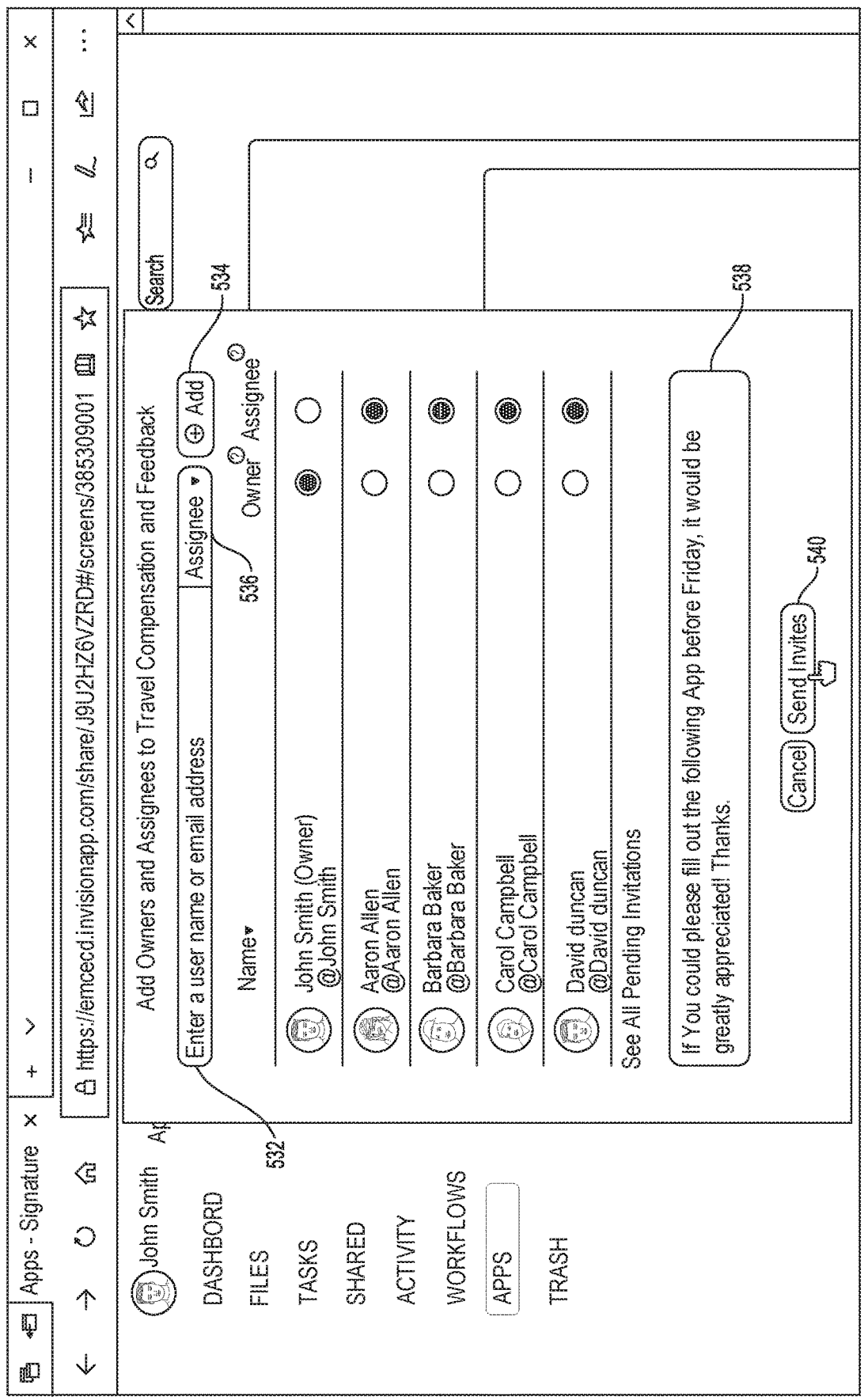

After the authorized user has finished building the form, it can be saved, and users can be selected to provide data through the form. A user selection screen is illustrated in FIG. 5D. In this embodiment, the user selection screen allows users to be added by entering a user name (for internal users) or an email address (for internal or external users) in field 532 and clicking "add" button 534. Users may be added as owners of the form or assignees (users who will fill out the form) using drop-down 536. Users who have been added are listed in the selection screen with an indication of whether they are owners or assignees. A field 538 may be used by the authorized user to provide instructions to the selected users for filling out the form. When the desired assignees have been selected, the authorized user can click on the "send invites" button 540 to send invitations to each of the selected users to fill out the form.

Figure 5E:
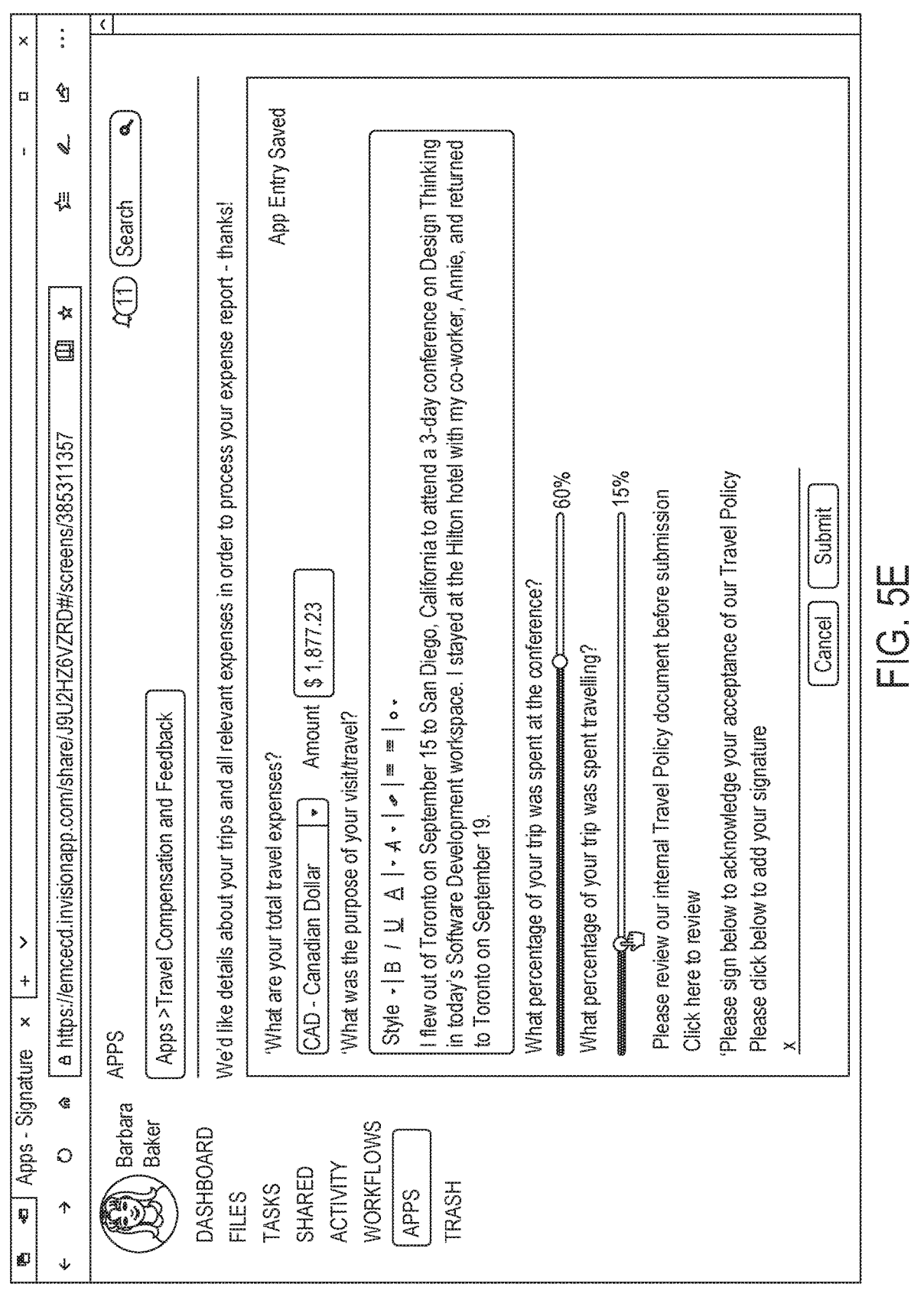
Figure 5F:
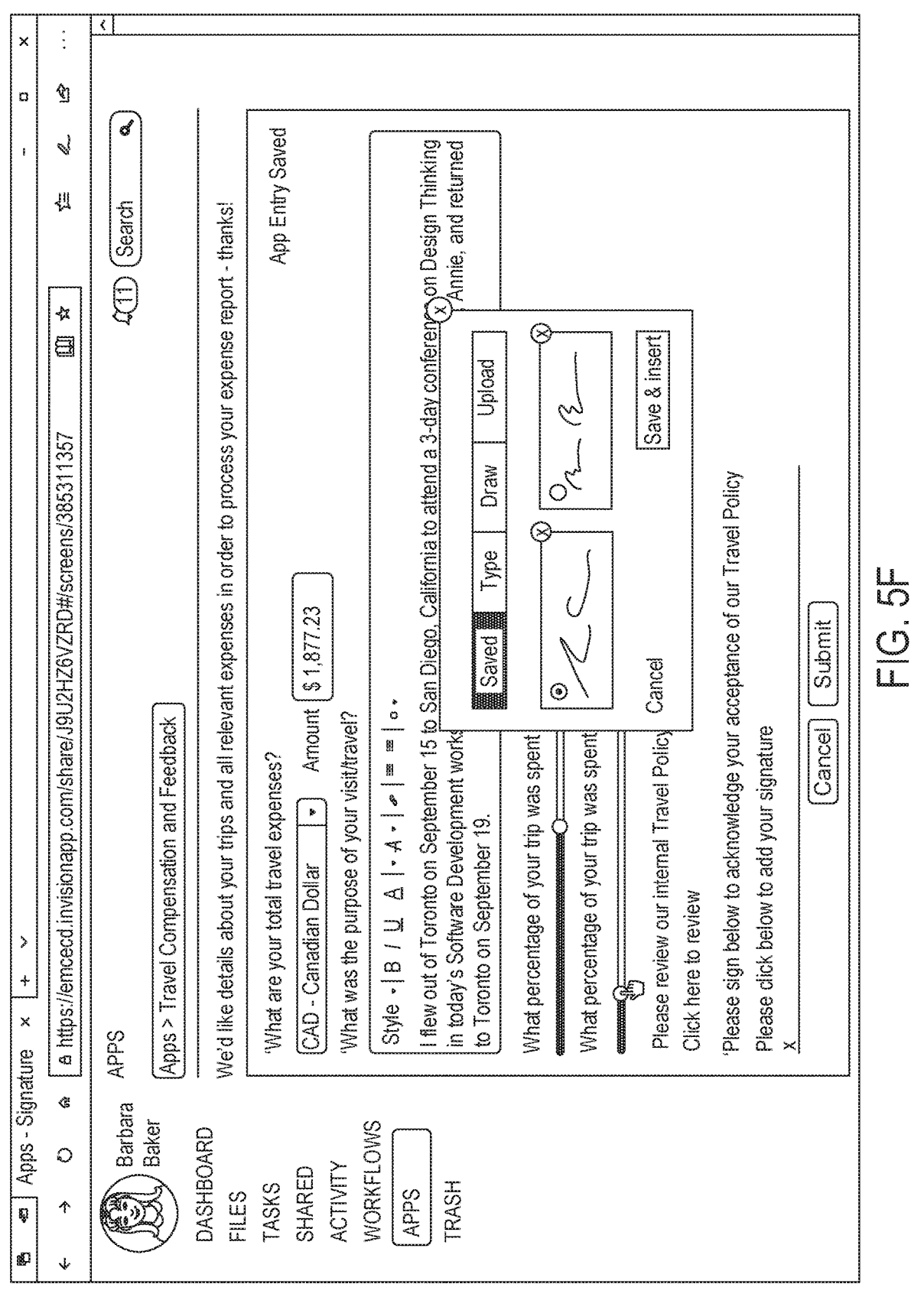
Figure 5G:
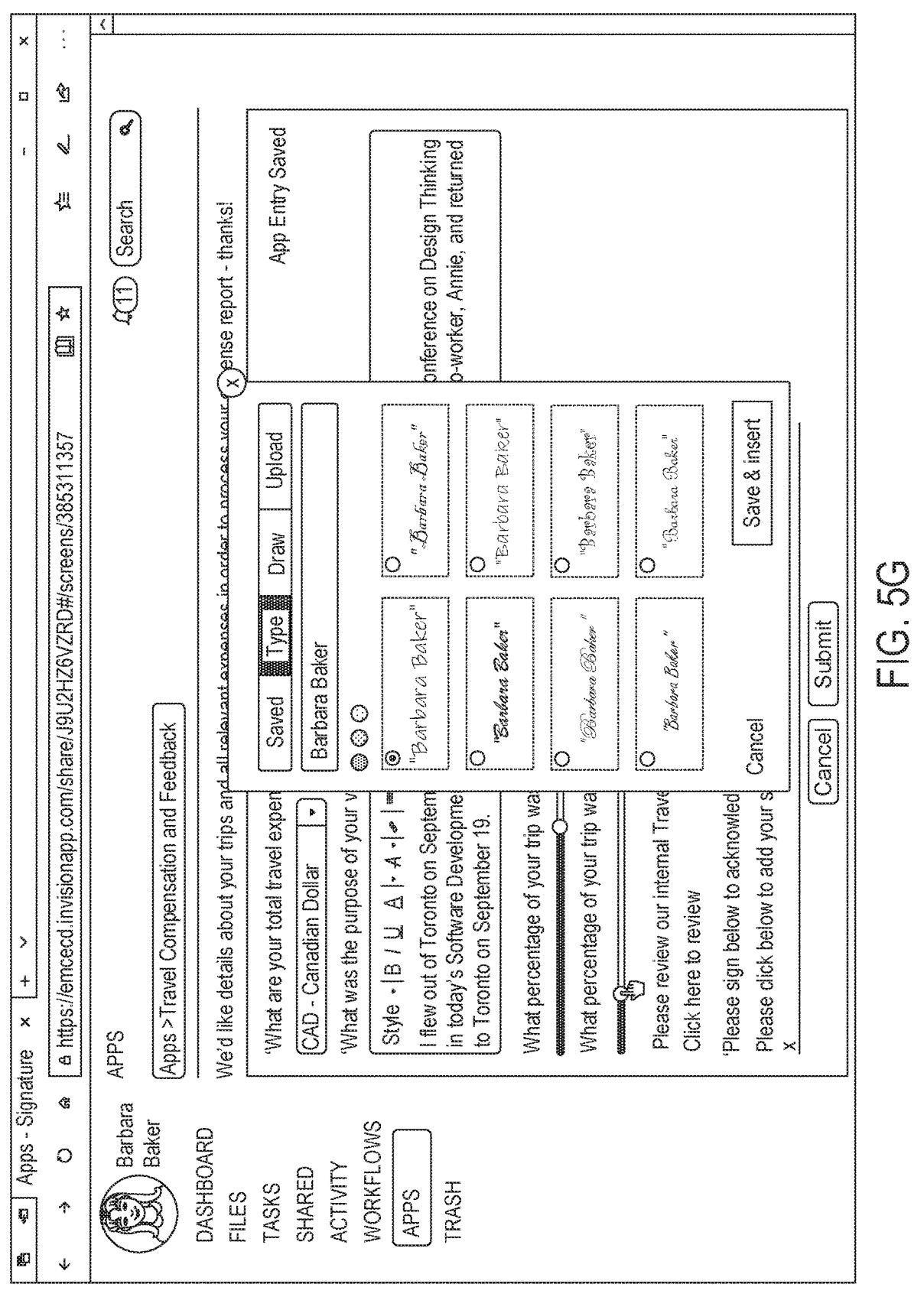
Figure 5H:
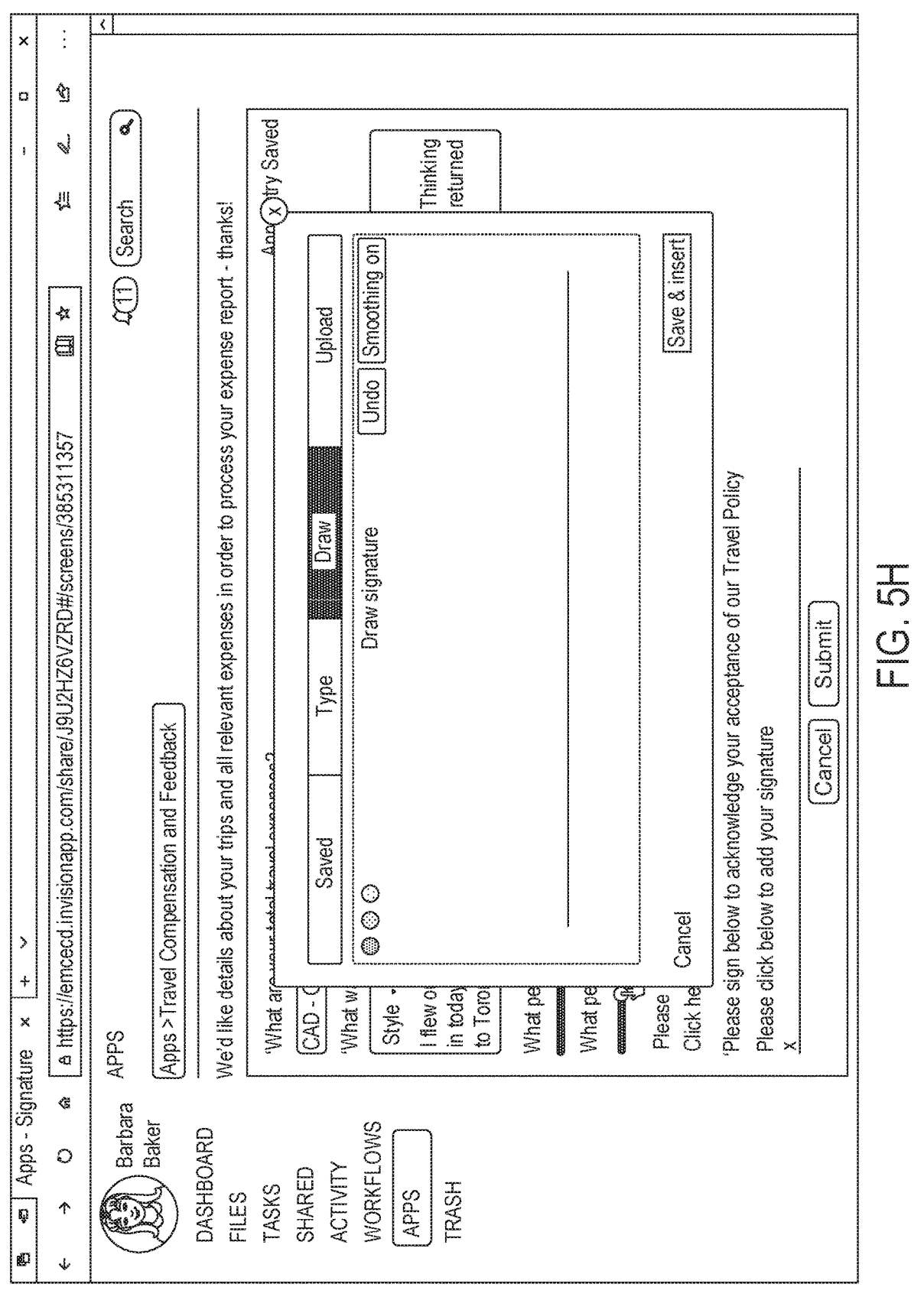
Figure 5I:
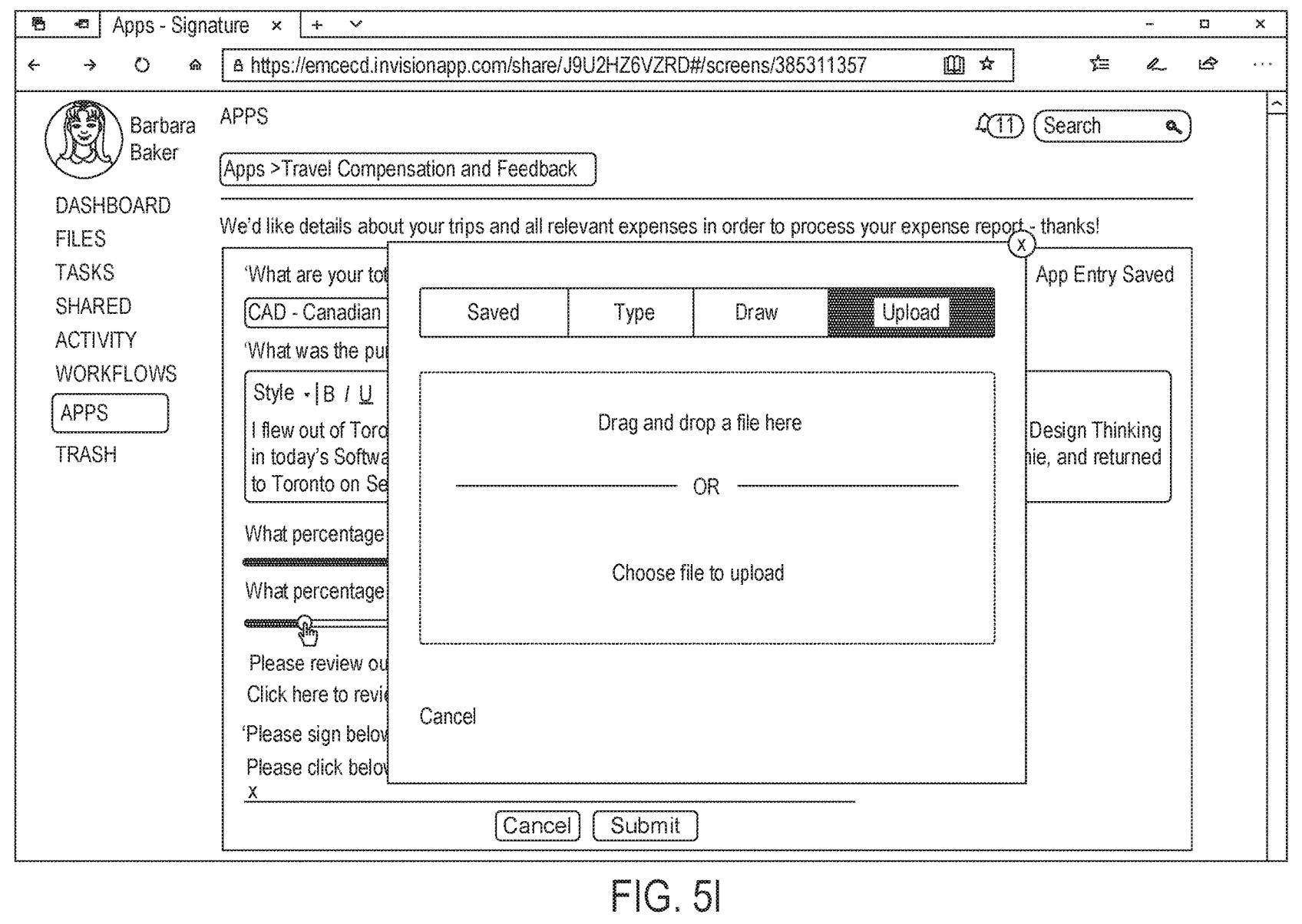
Figure 5J:
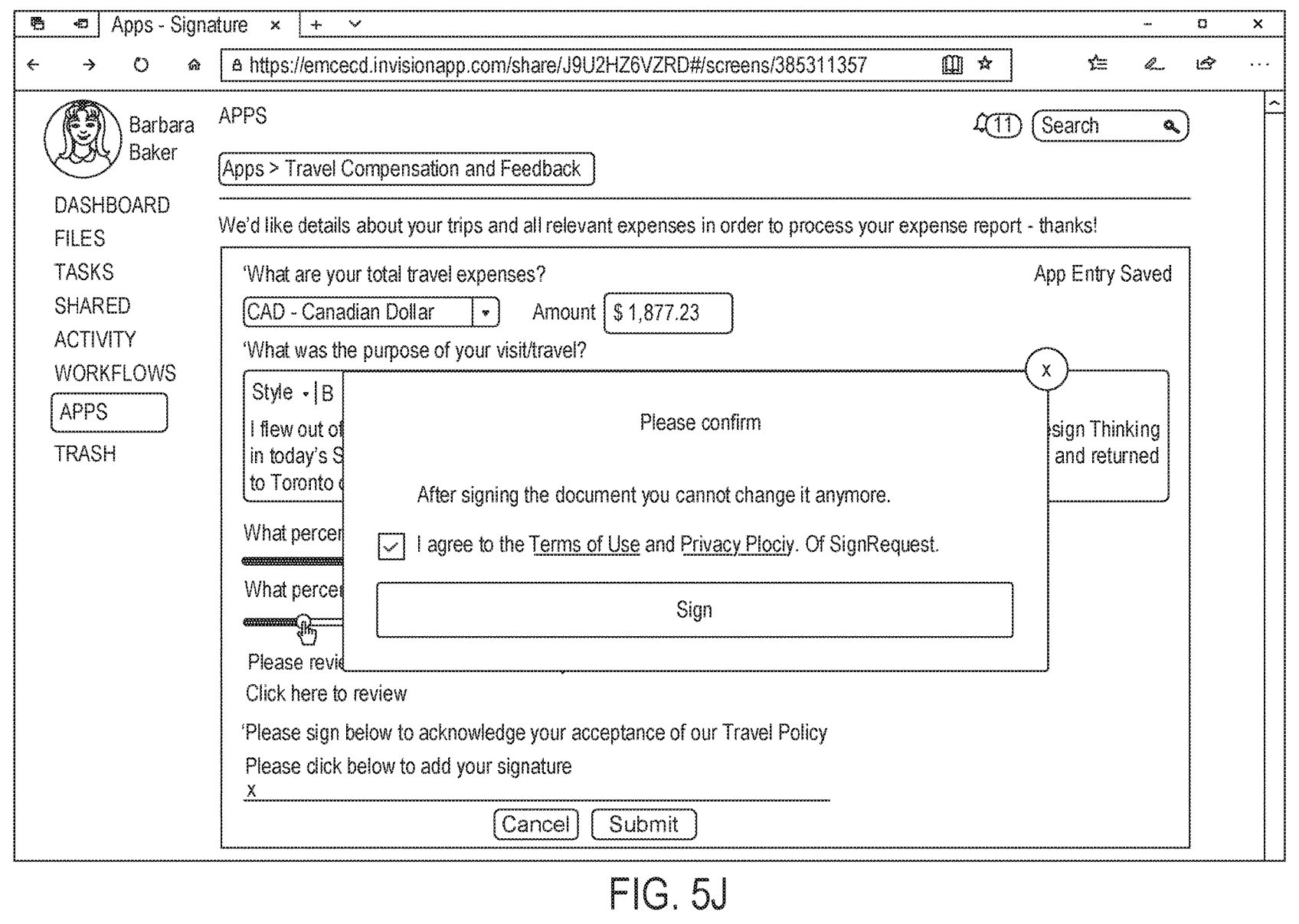

Referring to FIG. 5E, an example of a form which has been filled out by one of the assignees is shown. As depicted in this figure, the assignee has entered a currency and amount for travel expenses, and has provided a brief description of the purpose of the travel. Sliders have been used to indicate the percentages of the trip that were spent at a conference and traveling. The form shown in this figure has not yet been electronically signed by the assignee. The assignee's electronic signature may be provided in a number of different ways which are depicted in FIGS. 5F-5I. in FIG. 5F, the assignee can select one of a set of previously saved signatures. In FIG. 5G, the assignee can type their name and select one of a set of displayed fonts. In FIG. 5H, the assignee can provide a signature or by drawing (physically signing) using a suitable I/O device (e.g., a stylus and touchscreen). In FIG. 5I, the assignee can elect to drag-and-drop or upload a file corresponding to their electronic signature. After the assignee has provided their signature using one of these methods, the forms app may notify the assignee that the provided data cannot be changed after it is signed, and may require that the assignee confirm agreements to, e.g., applicable terms of use and privacy policies as shown in FIG. 5J.

Figure 5K:
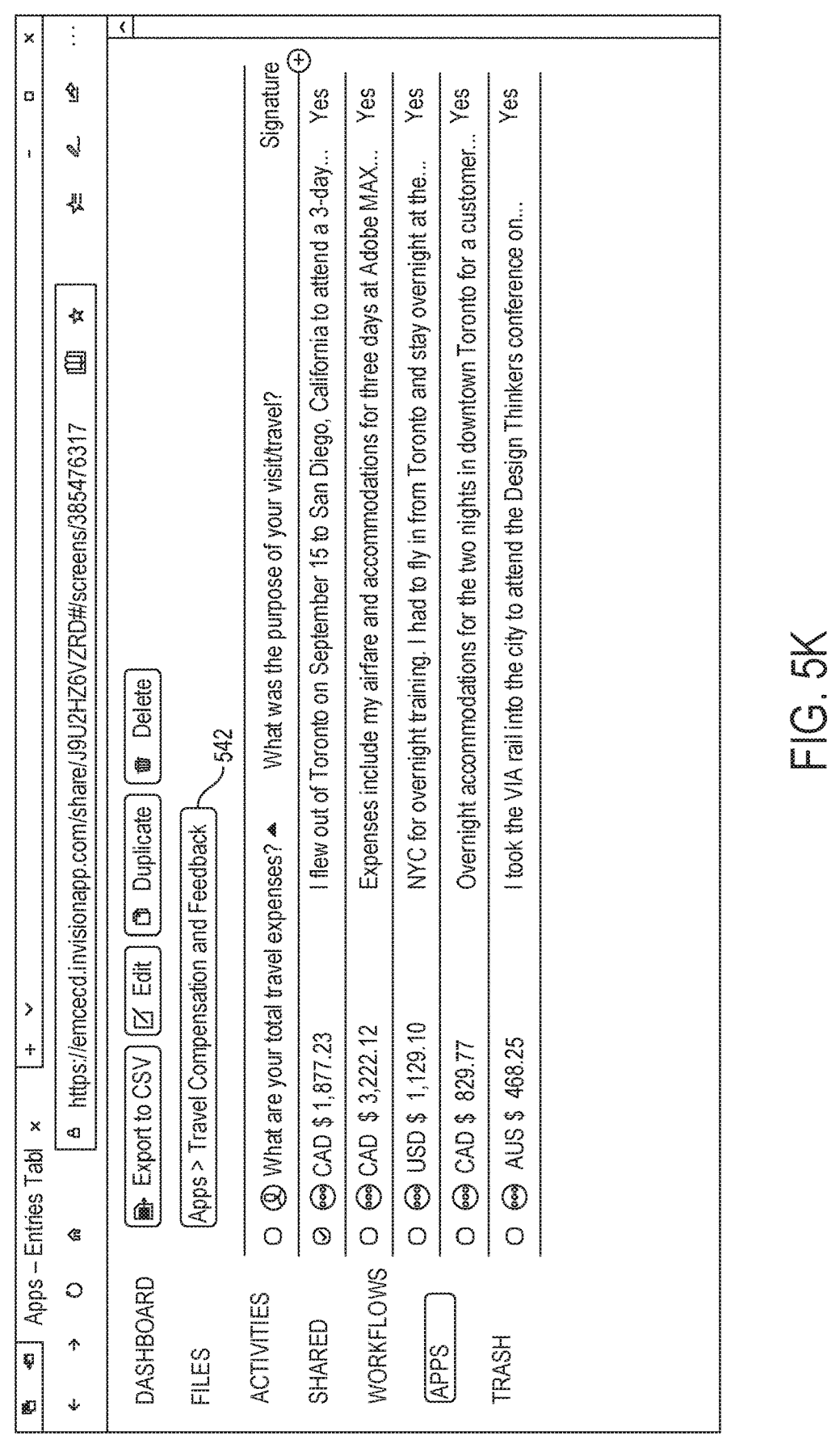

As information is provided by the assignees via the form, a summary of the information is made available to the form owners as shown in FIG. 5K. The form owners may include the authorized user who created the form, as well as any owners indicated in the list depicted in FIG. 5D. In this example, selected fields of the form (currency amount and travel purpose) are displayed. These fields may, for example, be selected by the form owner after the form is built. As depicted in this figure, the summary indicates, for each assignee, whether the assignee has electronically signed their the information which they provided. It should be noted that, while the summary of the assignee data identifies the form through which the data was provided (see form indicator 542), the data is stored separately from the form, and the signatures are attached to the data, rather than to the form.

The form owner may elect to export the data provided by the assignees to a file such as a spreadsheet, database table, comma-delimited value file. Referring to FIG. 5L, an exemplary spreadsheet containing the assignee data is shown. In this example, the spreadsheet includes a column for each of the form components (currency and amount, travel purpose, percentage at conference, percentage traveling, review of travel policy, and signature). For each assignee, the data provided by that assignee is contained in a corresponding row of the spreadsheet. Each row of data includes a link to an image file for the corresponding assignee's signature.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be executable by one or more server machines. Examples of a non-transitory computer readable medium are provided below in this disclosure.

As is known to those skilled in the art, a suitable computer system can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

'Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions executable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method for enabling collection of signed data in a collaborative content sharing platform, the method comprising:
    producing a form, the form having one or more data entry components and at least one signature block component;
    selecting one or more assignee users of the collaborative content sharing platform;
    providing the form to the one or more selected assignee users and thereby enabling the one or more selected assignee users to access the form;
    receiving, from at least one of the one or more selected assignee users through the form, first input corresponding to at least one of the one or more data entry components;
    receiving, from the at least one of the one or more selected assignee users through the form, second input indicative of an electronic signature of the at least one of the one or more selected assignee users corresponding to the first input; and
    for each of the at least one of the one or more selected assignee users, storing the first input with the corresponding second input indicative of the selected assignee user's electronic signature, wherein the first and second inputs are stored in a data structure which is separate from the form.

2. The method of claim 1, wherein for each of the at least one of the one or more selected assignee users, the first input of the assignee user and a reference to the electronic signature of the assignee user are stored in a same record of a database table.

3. The method of claim 2, wherein the database table does not contain the form.

4. The method of claim 2, wherein the record contains an identifier associated with the form, but does not contain the form.

5. The method of claim 2, wherein the database table includes multiple records, including at least a first record associated with a first assignee user of the one or more selected assignee users and a second record associated with a second assignee user of the one or more selected assignee users.

6. The method of claim 1, wherein the one or more selected assignee users comprise at least one tenant user of the collaborative content sharing platform.

7. The method of claim 6, the method further comprising, for the tenant user, identifying electronic signature data stored in the collaborative content sharing platform, verifying the second input indicative of the electronic signature using the electronic signature data stored in the collaborative content sharing platform, and storing a reference to the electronic signature data stored in the collaborative content sharing platform.

8. The method of claim 1, wherein the one or more selected assignee users comprise at least one external user who is not a tenant of the collaborative content sharing platform.

9. The method of claim 8, the method further comprising, for the external user, verifying the second input indicative of the electronic signature using electronic signature data external to the collaborative content sharing platform, and storing a reference to the electronic signature data in a record stored in the collaborative content sharing platform.

10. A system for enabling collection of signed data comprising:
    a collaborative content sharing platform that includes one or more hardware processors;
    two or more user devices communicatively coupled to the content sharing platform;
    one or more data storage devices communicatively coupled to the content sharing platform;
    wherein the content sharing platform is configured to enable a first user on a first one of the two or more user devices to
        produce a form having one or more data entry components and at least one signature block component, and
        select one or more assignee users;
    wherein the content sharing platform is further configured to
        provide the form to the one or more selected assignee users and enable the one or more selected assignee users to access the form,
        receive, from at least one of the one or more selected assignee users through the form, first input corresponding to at least one of the one or more data entry components,
        receive, from the at least one of the one or more selected assignee users through the form, second input indicative of an electronic signature of the at least one of the one or more selected assignee users corresponding to the first input, and store, for each of the at least one of the one or more selected assignee users, the first input with the corresponding second input indicative of the selected assignee user's electronic signature, wherein the first and second inputs are stored in the one or more data storage devices in a data structure which is separate from the form.

11. The system of claim 10, wherein the content sharing platform is further configured to, for each of the at least one of the one or more selected assignee users, store the first input of the assignee user and a reference to the electronic signature of the assignee user are stored in the same record of a database table.

12. The system of claim 11, wherein the content sharing platform contains a forms app which is configured to enable the first user to build the form by selecting one or more form components, at least one of the form components being a signature component, adding the selected form components to the form, and configuring one or more attributes of the added form components.

13. The system of claim 11, wherein the record contains an identifier associated with the form, but does not contain the form.

14. The system of claim 10, wherein the one or more selected assignee users comprise at least one tenant user of the collaborative content sharing platform, wherein the content sharing platform is configured to, for the tenant user, identify electronic signature data stored in a data storage device internal to the collaborative content sharing platform, verify the second input indicative of the electronic signature using the electronic signature data stored in the collaborative content sharing platform, and store a reference to the electronic signature data stored in the collaborative content sharing platform.

15. The system of claim 10, wherein the one or more selected assignee users comprise at least one external user who is not a tenant of the collaborative content sharing platform, wherein the content sharing platform is configured to, for the external user, verify the second input indicative of the electronic signature using electronic signature data external to the collaborative content sharing platform, and store a reference to the electronic signature data In a record stored in the collaborative content sharing platform.

16. A computer program product comprising a non-transitory computer-readable medium storing instructions executable by one or more processors to perform:
producing a form, the form having one or more data entry components and at least one signature block component;
selecting one or more assignee users of a collaborative content sharing platform;
providing the form to the one or more selected assignee users and thereby enabling the one or more selected assignee users to access the form;
receiving, from at least one of the one or more selected assignee users through the form, first input corresponding to at least one of the one or more data entry components;
receiving, from the at least one of the one or more selected assignee users through the form, second input indicative of an electronic signature of the at least one of the one or more selected assignee users corresponding to the first input; and
for each of the at least one of the one or more selected assignee users, storing the first input with the corresponding second input indicative of the selected assignee user's electronic signature, wherein the first and second inputs are stored in a data structure which is separate from the form.

17. The computer program product of claim 16, wherein for each of the at least one of the one or more selected assignee users, the first input of the assignee user and a reference to the electronic signature of the assignee user are stored in a same record of a database table.

18. The computer program product of claim 17, wherein the record contains an identifier associated with the form, but does not contain the form.

19. The computer program product of claim 16, wherein the one or more selected assignee users comprise at least one tenant user of the collaborative content sharing platform, the method further comprising, for the tenant user, identifying electronic signature data stored in the collaborative content sharing platform, verifying the second input indicative of the electronic signature using the electronic signature data stored in the collaborative content sharing platform, and storing a reference to the electronic signature data stored in the collaborative content sharing platform.

20. The computer program product of claim 16, wherein the one or more selected assignee users comprise at least one external user who is not a tenant of the collaborative content sharing platform, the method further comprising, for the external user, verifying the second input indicative of the electronic signature using electronic signature data external to the collaborative content sharing platform, and storing a reference to the electronic signature data In a record stored in the collaborative content sharing platform.

* * * * *